US008612543B2

(12) United States Patent
Shuster

(10) Patent No.: US 8,612,543 B2
(45) Date of Patent: *Dec. 17, 2013

(54) PERSONAL CRITERIA VERIFICATION USING FRACTIONAL INFORMATION

(71) Applicant: Hoshiko LLC, Henderson, NV (US)

(72) Inventor: Gary Stephen Shuster, Fresno, CA (US)

(73) Assignee: Hoshiko LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/682,539

(22) Filed: Nov. 20, 2012

(65) Prior Publication Data

US 2013/0081117 A1 Mar. 28, 2013

Related U.S. Application Data

(63) Continuation of application No. 13/188,666, filed on Jul. 22, 2011, now Pat. No. 8,321,531, which is a continuation of application No. 12/471,240, filed on May 22, 2009, now Pat. No. 7,996,491, which is a continuation of application No. 11/029,298, filed on Jan. 4, 2005, now Pat. No. 7,539,736, which is a continuation of application No. 09/850,838, filed on May 8, 2001, now Pat. No. 6,862,610.

(60) Provisional application No. 60/202,753, filed on May 8, 2000.

(51) Int. Cl.
*G06F 15/16* (2006.01)
*G06F 7/00* (2006.01)

(52) U.S. Cl.
USPC ............ 709/217; 709/219; 707/705; 707/758

(58) Field of Classification Search
USPC ........................... 709/217, 219; 707/705, 758
See application file for complete search history.

(56) References Cited

U.S. PATENT DOCUMENTS

| | | | |
|---|---|---|---|
| 5,311,594 | A | 5/1994 | Penzias |
| 5,560,005 | A | 9/1996 | Hoover et al. |
| 5,912,949 | A | 6/1999 | Chan et al. |
| 6,018,724 | A | 1/2000 | Arent |
| 6,073,130 | A | 6/2000 | Jacobson et al. |
| 6,088,799 | A | 7/2000 | Morgan et al. |
| 6,112,181 | A | 8/2000 | Shear et al. |
| 6,208,717 | B1 | 3/2001 | Yeh et al. |
| 6,226,669 | B1 | 5/2001 | Huang et al. |
| 6,282,658 | B2 | 8/2001 | French et al. |
| 6,311,186 | B1 | 10/2001 | MeLampy et al. |
| 6,366,903 | B1 | 4/2002 | Agrawal et al. |
| 6,366,910 | B1 | 4/2002 | Rajaraman et al. |
| 6,374,259 | B1 | 4/2002 | Celik |
| 6,606,744 | B1 | 8/2003 | Mikurak |
| 6,704,787 | B1 | 3/2004 | Umbreit |
| 6,711,681 | B1 | 3/2004 | Al-Salqan et al. |
| 6,734,886 | B1 | 5/2004 | Hagan et al. |
| 6,839,680 | B1 | 1/2005 | Liu et al. |
| 6,862,610 | B2 | 3/2005 | Shuster |
| 7,010,572 | B1 | 3/2006 | Benjamin et al. |
| 7,539,736 | B2 | 5/2009 | Shuster |
| 2002/0095482 | A1 | 7/2002 | Shuster |
| 2005/0120249 | A1 | 6/2005 | Shuster |
| 2009/0249449 | A1 | 10/2009 | Shuster |
| 2009/0254971 | A1 | 10/2009 | Herz et al. |

*Primary Examiner* — Ranodhi Serrao

(57) ABSTRACT

A method for verifying the identity of users connected to a computer network comprises providing fractional information queries to users, wherein responses to these individual queries are not sufficient to identify the user. This method further comprises receiving responses to these fractional information queries and comparing these responses to data available from within a computer network. A set of potential matches to the user is generated according to these responses and is used in determining whether the set of potential matches is sufficient to identify the user.

20 Claims, 2 Drawing Sheets

PERSONAL CRITERIA VERIFICATION USING FRACTIONAL INFORMATION

CROSS-REFERENCE TO RELATED APPLICATIONS

The present application is a continuation of U.S. application Ser. No. 13/188,666, filed Jul. 22, 2011 (now U.S. Pat. No. 8,321,531), which is a continuation of U.S. application Ser. No. 12/471,240, filed May 22, 2009 (now U.S. Pat. No. 7,996,491), which is a continuation of U.S. application Ser. No. 11/029,298, filed Jan. 4, 2005 (now U.S. Pat. No. 7,539,736), which is a continuation of U.S. application Ser. No. 09/850,838, filed May 8, 2001 (now U.S. Pat. No. 6,862,610), which claims priority to U.S. Provisional Appl. No. 60/202,753, filed May 8, 2000; the disclosures of each of the above-referenced applications are incorporated by reference herein their entireties.

BACKGROUND OF THE INVENTION

1. Field of the Invention

The present invention relates to the verification of an individual's identity in a wide area network. More specifically, this invention relates to a method and apparatus for verifying identity using fractional information taken from the user.

2. Description of the Related Art

For many years, the global retail market has been characterized as a market in which products are sold from physical locations. In recent years, however, this dynamic has undergone a significant change in response to the increasing popularity of the Internet. It should be appreciated that the Internet is defined here as a collection of interconnected (public and/or private) networks linked together by a set of standard protocols (such as TCP/IP and HTTP) to form a global, distributed network. While this term is intended to refer to what is now commonly known as the Internet, it is also intended to encompass variations which may be made in the future, including changes and additions to existing standard protocols. Using the internet, businesses can now more readily sell their products to a vast number of customers beyond local boundaries. Business transacted primarily over computer networks such as the Internet is commonly known as electronic commerce and will herein be referred to as such.

Systems for wide-area networks, such as the Internet, are presently limited, however, in the amount of security they offer to consumers and businesses against fraud. In particular, in electronic commerce it is commonplace to approve electronic transactions without ever seeing the purchaser or viewing any identifying material (such as a drivers license). In add to financial fraud, the Internet has also experienced a growing problem with regards to age representation fraud, whereby underage individuals are able to gain unauthorized access to many websites on the Internet by claiming to be older than they actually are. To prevent such unauthorized access (and in general, to prevent other forms of fraud and theft), it is desirable to confirm the identity and/or age of the user requesting access to restricted material by checking an identifying code supplied by an unknown user against publicly available identity databases. For example, if a social security number is supplied, this information can then be used to verify other information about the user, such as the user's age, gender, credit history, state of residence, etc. For further example, many Internet age-verifying services operate chiefly by obtaining a user's credit card number over the Internet.

While it is certainly possible in an electronic commerce transaction to request identifying information about an individual, such as a full social security number, credit card number, or a telephone number, individuals are in many situations reluctant to give such information for fear of compromising their privacy or risking loss of control over their confidential identifying and account information. Individuals may be particularly reluctant to share identifying information when the reputation of the requesting entity is not known to the user, and its trustworthiness is therefore in question. Currently, no system exists that enables users to verify certain facts about themselves, such as their age, without forfeiting their privacy and supplying confidential identity numbers to a potentially untrustworthy requestor. If these disadvantages could be overcome, it is anticipated that more electronic commerce transactions would occur than presently take place. It would thus be advantageous to implement an electronic business method and system which enables businesses to verify the identity of such clients at a minimal risk to the clients' privacy and without needing to posses confidential identity numbers belonging to the clients.

SUMMARY OF THE INVENTION

In an embodiment of the invention, a method and apparatus for verifying the identity of users connected to a computer network comprises providing fractional information queries to users, wherein responses to individual ones of these queries are not sufficient to identify the user. In combination, however, the responses to the queries have a very high probability of uniquely identifying the user. This method further comprises receiving responses to these fractional information queries and comparing these responses to data available from a secure, preferably independent source within a computer network. A set of potential matches to the user is generated according to these responses by the secure source. If more than one match is discovered, additional information may be supplied by the user until the users identity is confirmed. At the same time, the potentially untrustworthy site need not ever posses any identifying information while still being assured that the user is who she claims to be.

A more complete understanding of a method and apparatus for identifying the identity of individuals will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention is directed towards a method and apparatus for verifying the identity of individuals in a wide area network. More specifically, this invention is directed towards verifying an individual's identity using fractional information taken from the user.

Figure 1:
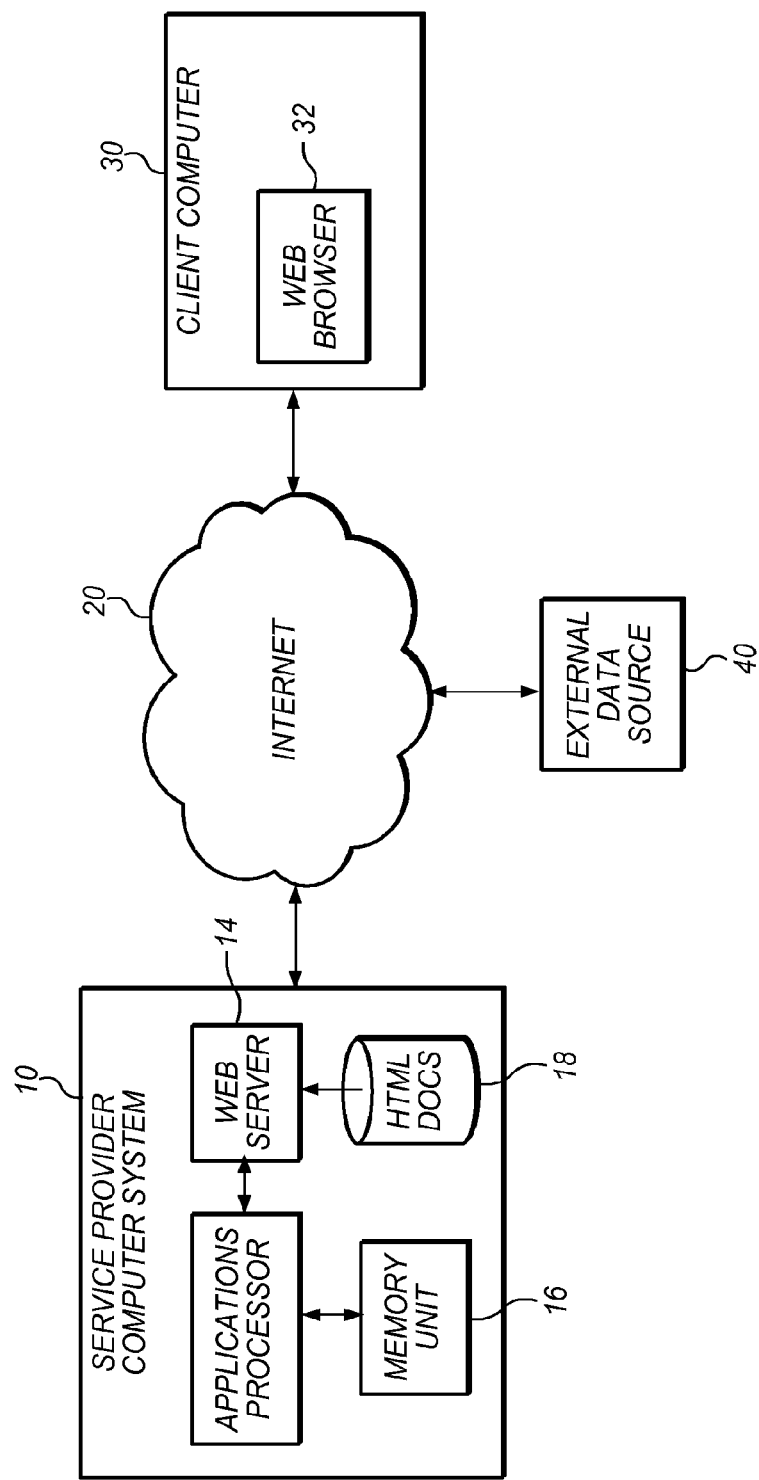
FIG. 1 is block diagram demonstrating a preferred embodiment of the invention.

Referring first to FIG. 1, a block diagram is illustrated of a wide area network employing a method and apparatus according to an embodiment of the invention. Although the invention is especially suitable for implementation on a system as will be described, the method may also be effectively implemented on other systems. It is anticipated that the present invention operates with a plurality of computers that are coupled together on a wide area network, such as the Internet 20, or other communications network. FIG. 1 depicts such a network that includes a service provider computer system 10, a client computer 30, and an external data source 40. The service provider computer system 10 is further comprised of an applications processor 12 coupled to a memory unit 16 and a Web server 14 connected to an HTML (Hyper-Text Markup Language) documents database 18.

It should be appreciated that Web server 14 accesses a plurality of Web pages, distributable applications, and other electronic files containing information of various types stored in the HTML documents database 18. As a result, Web pages may be viewed on various web-enabled computers in a given network, such as a client computer 30. For example, a particular Web page or other electronic file may be viewed through a suitable application program residing on the client computer 30 such as a browser 32, or by a distributable application provided to the client computer 30, by the Web server 33. It should be appreciated that many different information retrieval devices, many different Web servers, and many different search servers of various types may be communicating with each other at the same time.

As is generally known in the art, a client identifies a Web page it wishes to retrieve by communicating an HTTP (Hyper-Text Transport Protocol) request from the browser application 32. The HTTP request includes the Uniform Resource Locator (URL) of the desired Web page, which may correspond to an HTML document stored in the HTML documents database 18. The HTTP request is then routed to the Web server 14 via the Internet 20. The Web server 14 then retrieves the HTML document identified by the URL, and communicates the HTML document across the Internet 20 to the browser application 32. The HTML document may be communicated in the form of plural message packets as defined by standard protocols, such as the Transport Control Protocol/Internet Protocol (TCP/IP).

The external data source 40 is preferably a secure database run by an independent service provider. Service providers and other entities that desire to practice the method to identify individuals may subscribe to the database in advance of performing the search. They may be assigned an encryption key by the database service to ensure the security of messages exchanged with the external data provider. This is particularly desirable where the identity information to be transmitted back from the database is especially sensitive or confidential, for example, where it comprises an individual's credit history. For other applications, such as age verification, the information transmitted back may comprise a bare confirmation that the individual has (or has not, as the case may be) attained the required age. Such information is unlikely to require encryption.

Figure 2:
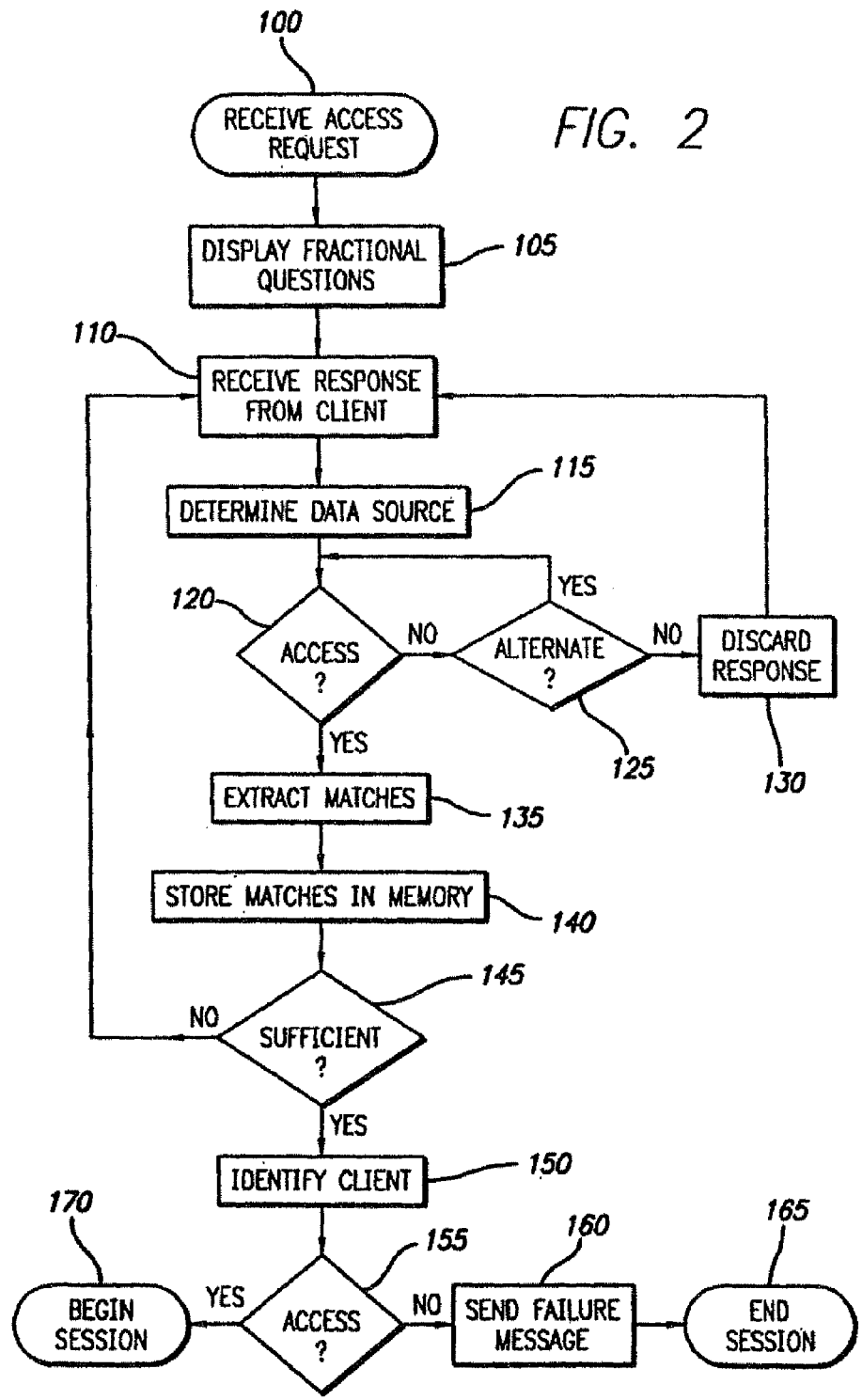
FIG. 2 is a flow chart illustrating the steps for identifying a client according to an embodiment of the invention.

In FIG. 2, a flow chart illustrating the steps for identifying a client according to an embodiment of the invention is shown. The identifying procedure begins at step 100 when the service provider computer system 10 receives a website access request from a client computer 30. At step 105, the service provider computer system 10 responds to this request by prompting the client to answer several "fractional questions". It should be appreciated that a "fractional question" is defined hereinafter as a question where only partial information is asked (e.g., the first three digits of a phone number, the last four digits of a social security number, etc.). For example, the client may be asked to supply his age, last four digits of his social security number, last four digits of his telephone number, and first three numbers of his street address (inserting spaces or zeros if the street address has less than three digits). Such information will preferably not contain data of a nature that will enable ready identification of the individual except by using an extensive database of social security numbers, telephone numbers, addresses, and etc., all linked to the desired identity data. For example, it would generally not be desirable to include the entire zip code or street address in such information, because doing so could make the task of identifying the user too easy or even trivial.

The procedure continues at step 110 with the service provider computer system 10 receiving a response to individual fractional questions from the client. Beginning with the first received response at step 110, the service provider computer system 10 determines which external data source 40 it will use to confirm those particular responses. Access to the external data source 40 chosen at step 115 is then requested at step 120. If access is granted to the external data source 40 at step 120, then the procedure continues with the extraction of all matches to the fractional information provided by the client which are included in that particular data source 40. If for some reason the primary database is not available or has no data matching the fractional information, the service provider computer system 10 may attempt to use an alternate data source 40 at optional step 125. If an alternate data source 40 is found at step 125, then access to this data source is requested at step 120, otherwise, this particular client response is discarded at step 130, followed by a return to step 110 where the procedure is repeated for the next client response. In an alternative embodiment, certain of the fractional information are withheld from each database provider, making it impossible for any single database provider to possess the identity of the requestor. Instead, the database responses may be combined and analyzed by an independent, trusted source, thereby adding another layer of privacy and security.

Once the extraction of all fractional information matches is made at step 135, the procedure continues at step 140 with these matches being stored in the memory unit 16 of the service provider computer system 10. At step 145, the service provider computer system 10 then determines whether the matches stored in its memory unit 16 are sufficient to identify the client. In an exemplary embodiment, a service provider computer system 10 may contain "n" number of matches in its memory unit 16 at step 140. If this particular service provider were only concerned with its clients being over a certain age, the sufficiency criterion at step 145 may be fulfilled if all "n" individuals satisfy the service provider's age requirements. In another example, a service provider may be more concerned with financial fraud, in which case a sufficiency criterion that identifies a specific individual would be more appropriate.

If the number of matches stored in the memory unit 16 satisfy the aforementioned sufficiency criterion, then the client is identified at step 150; otherwise, the service provider computer system 10 returns to step 110 where the procedure is repeated with respect to additional responses received from the client. For example, more detailed information in the same classes may be requested (for example, an additional digit of an identity number or additional letter of a name), or information from an entirely new class. It should be appreciated that if and when the above procedure requires an additional iteration at step 145 (i.e., the set of matches stored in the memory unit 16 do not satisfy the sufficiency criterion), the extracted set of matches in one iteration are used to begin the following iteration resulting in a set of matches that is smaller or equal in size to the set of matches found in the previous iteration.

Once a client is identified at step 150, the procedure continues at step 155 where the service provider computer system 10 determines whether to grant access to this particular client. It should be appreciated that this determination may vary according to the policies of each service provider. With respect to age, for example, one service provider may grant access to a client of a particular age while another service provider may not. If access is granted to the client at step 155, then the online session pertaining to that particular service provider begins at step 170; otherwise, a failure message is sent to the client at step 160 and the session is terminated at step 165. The service provider never possesses the specific identity of the client unless authorized by the client to receive such information.

Generally, it should be appreciated that the amount of fractional information provided by the user is an important aspect of the invention. For example, if eight out of nine digits of a social security number must be supplied, the privacy and confidentiality of the user may not be adequately protected. On the other hand, if too little unique information is supplied, for example, only one digit of the number, then the task of identifying the user may either not be possible, or may take too long. It is desirable, therefore, in the design of the specific identifying query to balance the speed with which an individual may be identified against the need to protect privacy and confidentiality. An appropriate query may be selected by one skilled in the database and statistical arts. It is further desirable that the query be impracticable to complete except using the most advanced databases that are available, so that the entities capable of performing the identity checking will be resistively few, and therefore, relatively more secure. It is anticipated that the database provider will be motivated to formulate a query structure that is perceived as very secure by the vast majority of users, in order to attract as much identity-checking business as possible.

Having thus described a preferred embodiment of a method and apparatus for identifying the identity of individuals, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

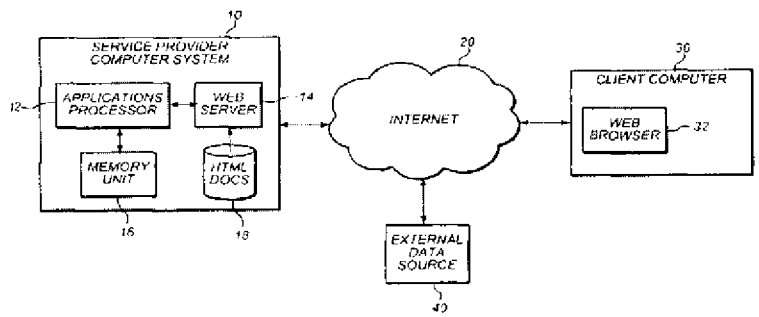

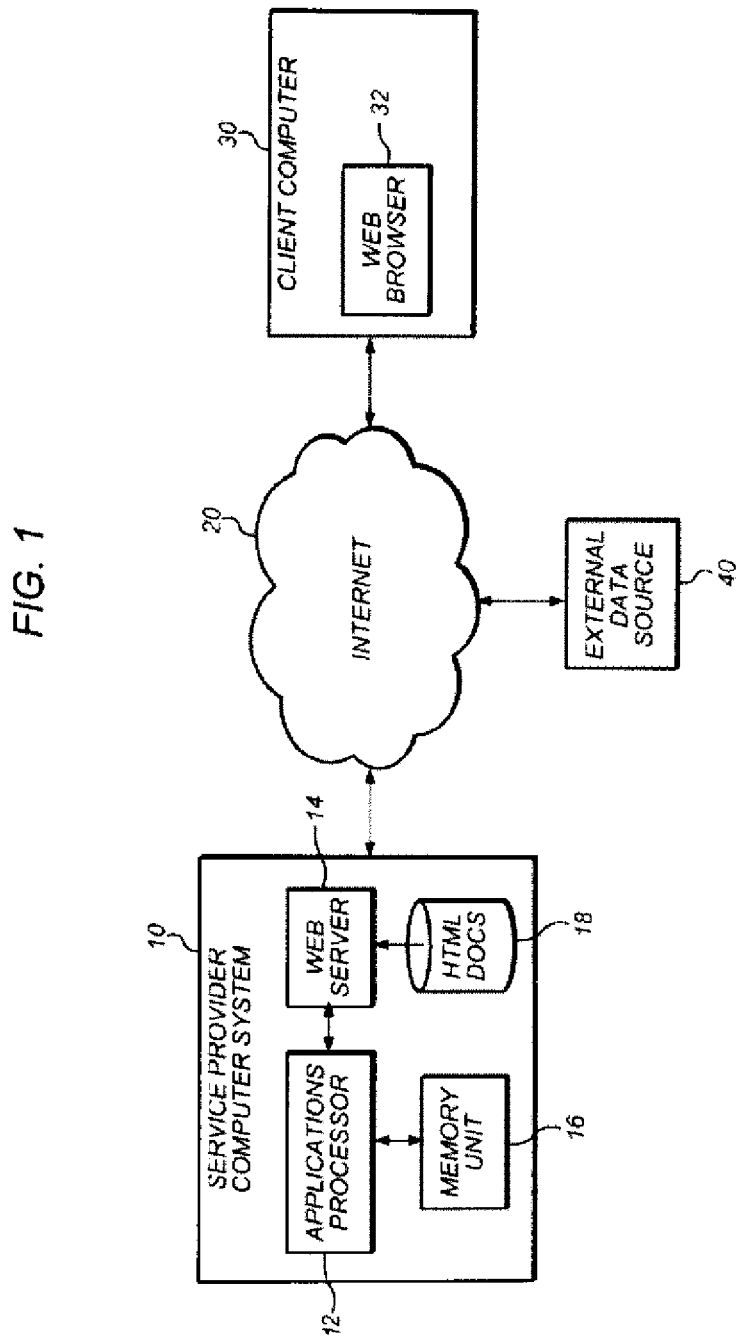

What is claimed is:

1. A method, comprising:
receiving, at a computing system of a service provider, a first partial identifying data item for an individual requesting access to a resource, wherein the first partial identifying data item includes less information than a respective full identifying data item for the individual;
accessing, by the computer system, a first set of one or more records associated with individuals having attributes matching the first partial identifying data item;
determining, by the computer system, whether the first set of one or more records satisfies a sufficiency criterion of the service provider for granting access to the resource; and
wherein the service provider does not have access to information sufficient to determine an identity of the individual requesting access to the resource at the computing system.

2. The method of claim 1, further comprising:
the computer system receiving the first set of one or more records from an external data source.

3. The method of claim 1, further comprising:
based on the received first partial identifying data item and the first set of one or more records, the computer system determining a type of a second partial identifying data item to be requested; and
the computer system requesting the second partial identifying data item of the determined type.

4. The method of claim 3, further comprising:
the computer system accessing a second set of one or more records associated with individuals having attributes matching the first partial identifying data item and attributes matching the second partial identifying data item;
the computer system determining whether the second set of one or more records satisfies a sufficiency criterion of the service provider for granting access to the resource.

5. The method of claim 1, further comprising:
determining that the first set of one or more records satisfies the sufficiency criterion based on each of the first set of one or more records being associated with individuals that meet a requirement of the service provider for accessing the resource.

6. The method of claim 1, wherein the sufficiency criterion for the service provider relates to an age requirement for the individual requesting access to the resource, and wherein the method further comprises the computer system granting access to the resource in response to determining that an age of the individual requesting access to the resource satisfies the requirement.

7. The method of claim 1, wherein the first partial identifying data item is a portion of a telephone number of the individual requesting access to the resource.

8. The method of claim 1, wherein the resource is a web page, a distributable application, or an electronic file.

9. A method, comprising:
receiving, at a computing system of a service provider, a partial identifying data item for an individual submitting a request, wherein the partial identifying data item is a portion of a respective full identifying data item for the individual;
determining, by the computing system, whether a set of one or more records satisfies a sufficiency criterion of the service provider for granting the request, wherein the set of one or more records is associated with individuals having attributes matching the partial identifying data item; and
wherein the service provider does not have access to information sufficient to determine an identity of the individual submitting the request at the computing system.

10. The method of claim 9, further comprising:
in response to determining that the set of one or more records does not satisfy the sufficiency criterion, the computing system requesting one or more additional partial identifying data items for the individual submitting the request; and
the computing system determining whether the sufficiency criterion has been satisfied based on the one or more additional partial identifying data items.

11. The method of claim 9, further comprising:
the computing system receiving the set of one or more records from a plurality of external sources.

12. The method of claim 9, further comprising:
the computing system granting the request in response to determining that the set of one or more records satisfies the sufficiency criterion.

13. The method of claim 9, wherein determining that the set of one or more records satisfies the sufficiency criterion includes determining that each of the individuals associated with the set of one or more records meet an age requirement of the service provider.

14. The method of claim 9, wherein the request is a HyperText Transport Protocol (HTTP) request.

15. The method of claim 9, wherein the sufficiency criterion relates to prevention of financial fraud by the individual submitting the request.

16. The method of claim 9, wherein the partial identifying data item is a portion of a street address associated with the individual submitting the request.

17. A method, comprising:
   a computer system of an external data source receiving, from a computer system of a service provider, a request for one or more records associated with individuals having attributes matching a partial data item that is a portion of a complete data item corresponding to an individual requesting access to a computer resource;
   the computer system of the external data source providing the one or more records to the computer system of the service provider, wherein the one or more records are usable by the computer system of the service provider to determine whether a sufficiency criterion of the service provider is satisfied in order to grant the individual access to the computer resource;
   wherein the one or more records of the external data source provided to the computer system of the service provider are not sufficient to determine an identity of the individual requesting access to the computer resource.

18. The method of claim 17, wherein the computer resource is a web page, and wherein the one or more records are usable by the computer system of the service provider to establish that the individual requesting access to the resource satisfies a minimum age requirement for accessing the web page.

19. The method of claim 17, wherein the external data source is one of a plurality of external sources configured to maintain records accessible to the computer system of the service provider.

20. The method of claim 17, wherein the partial data item is a portion of a social security number.

\* \* \* \* \*

UNITED STATES PATENT AND TRADEMARK OFFICE
CERTIFICATE OF CORRECTION

| | | |
|---|---|---|
| PATENT NO. | : 8,612,543 B2 | Page 1 of 3 |
| APPLICATION NO. | : 13/682539 | |
| DATED | : December 17, 2013 | |
| INVENTOR(S) | : Gary Stephen Shuster | |

It is certified that error appears in the above-identified patent and that said Letters Patent is hereby corrected as shown below:

Delete the title page and substitute therefore with the attached title page consisting of the corrected illustrative figure.

In the Drawings

Delete Drawing Sheet 1 of 2 and substitute therefore with the attached Drawing Sheet 1 of 2 consisting of replacement FIG. 1.

In the Specification

In Column 1, Line 50, delete "drivers" and insert -- driver's --, therefor.

In Column 2, Line 36, delete "users" and insert -- user's --, therefor.

In Column 2, Line 50, delete "is" and insert -- is a --, therefor.

In Column 5, Line 33, delete "resistively" and insert -- relatively --, therefor.

Signed and Sealed this
Twenty-sixth Day of August, 2014

Michelle K. Lee
*Deputy Director of the United States Patent and Trademark Office*

(12) United States Patent
Shuster

(10) Patent No.: US 8,612,543 B2
(45) Date of Patent: *Dec. 17, 2013

(54) PERSONAL CRITERIA VERIFICATION USING FRACTIONAL INFORMATION

(71) Applicant: Hoshiko LLC, Henderson, NV (US)

(72) Inventor: Gary Stephen Shuster, Fresno, CA (US)

(73) Assignee: Hoshiko LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/682,539

(22) Filed: Nov. 20, 2012

(65) Prior Publication Data

US 2013/0081117 A1    Mar. 28, 2013

Related U.S. Application Data

(63) Continuation of application No. 13/188,666, filed on Jul. 22, 2011, now Pat. No. 8,321,531, which is a continuation of application No. 12/471,240, filed on May 22, 2009, now Pat. No. 7,996,491, which is a continuation of application No. 11/029,298, filed on Jan. 4, 2005, now Pat. No. 7,539,736, which is a continuation of application No. 09/850,838, filed on May 8, 2001, now Pat. No. 6,862,610.

(60) Provisional application No. 60/202,753, filed on May 8, 2000.

(51) Int. Cl.
G06F 15/16    (2006.01)
G06F 7/00    (2006.01)

(52) U.S. Cl.
USPC ............. 709/217; 709/219; 707/705; 707/758

(58) Field of Classification Search
USPC ..................... 709/217, 219; 707/705, 758
See application file for complete search history.

(56) References Cited

U.S. PATENT DOCUMENTS

| | | |
|---|---|---|
| 5,311,594 A | 5/1994 | Penzias |
| 5,560,005 A | 9/1996 | Hoover et al. |
| 5,912,949 A | 6/1999 | Chan et al. |
| 6,018,724 A | 1/2000 | Arent |
| 6,073,130 A | 6/2000 | Jacobson et al. |
| 6,088,799 A | 7/2000 | Morgan et al. |
| 6,112,181 A | 8/2000 | Shear et al. |
| 6,208,717 B1 | 3/2001 | Yeh et al. |
| 6,226,669 B1 | 5/2001 | Huang et al. |
| 6,282,658 B2 | 8/2001 | French et al. |
| 6,311,186 B1 | 10/2001 | MeLampy et al. |
| 6,366,903 B1 | 4/2002 | Agrawal et al. |
| 6,366,910 B1 | 4/2002 | Rajaraman et al. |
| 6,374,259 B1 | 4/2002 | Celik |
| 6,606,744 B1 | 8/2003 | Mikurak |
| 6,704,787 B1 | 3/2004 | Umbreit |
| 6,711,681 B1 | 3/2004 | Al-Salqan et al. |
| 6,734,886 B1 | 5/2004 | Hagan et al. |
| 6,839,680 B1 | 1/2005 | Liu et al. |
| 6,862,610 B2 | 3/2005 | Shuster |
| 7,010,572 B1 | 3/2006 | Benjamin et al. |
| 7,539,736 B2 | 5/2009 | Shuster |
| 2002/0095482 A1 | 7/2002 | Shuster |
| 2005/0120249 A1 | 6/2005 | Shuster |
| 2009/0249449 A1 | 10/2009 | Shuster |
| 2009/0254971 A1 | 10/2009 | Herz et al. |

*Primary Examiner* — Ranodhi Serrao

(57) ABSTRACT

A method for verifying the identity of users connected to a computer network comprises providing fractional information queries to users, wherein responses to these individual queries are not sufficient to identify the user. This method further comprises receiving responses to these fractional information queries and comparing these responses to data available from within a computer network. A set of potential matches to the user is generated according to these responses and is used in determining whether the set of potential matches is sufficient to identify the user.

20 Claims, 2 Drawing Sheets